No. 791,254. PATENTED MAY 30, 1905.
G. H. DAY.
LENS CUTTING MACHINE.
APPLICATION FILED MAR. 24, 1905.
2 SHEETS—SHEET 1.
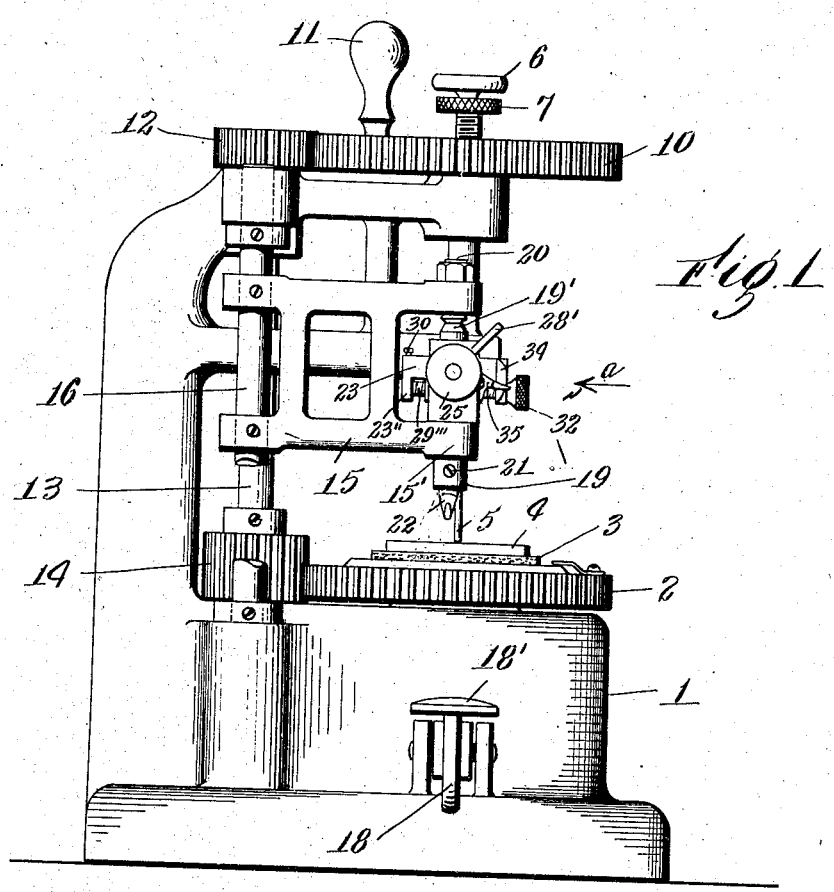
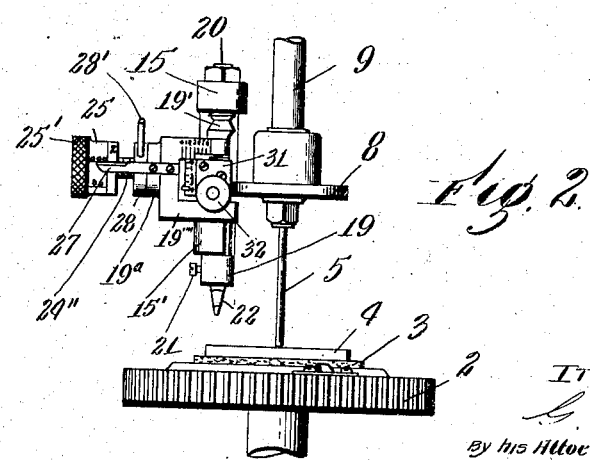

No. 791,254. PATENTED MAY 30, 1905.
G. H. DAY.
LENS CUTTING MACHINE.
APPLICATION FILED MAR. 24, 1905.
2 SHEETS—SHEET 2.
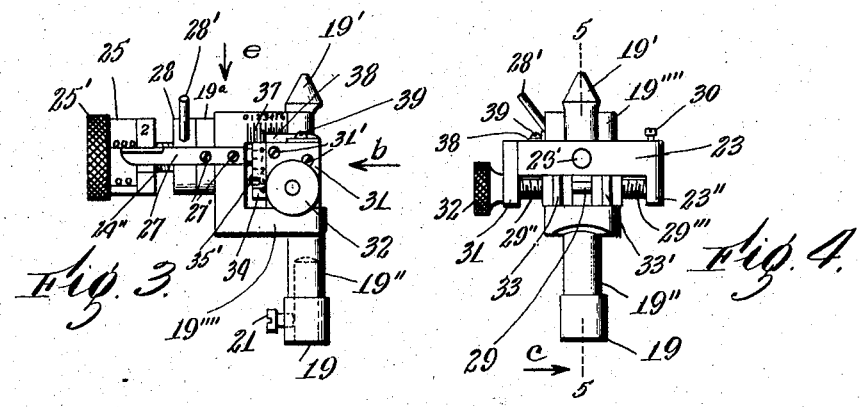
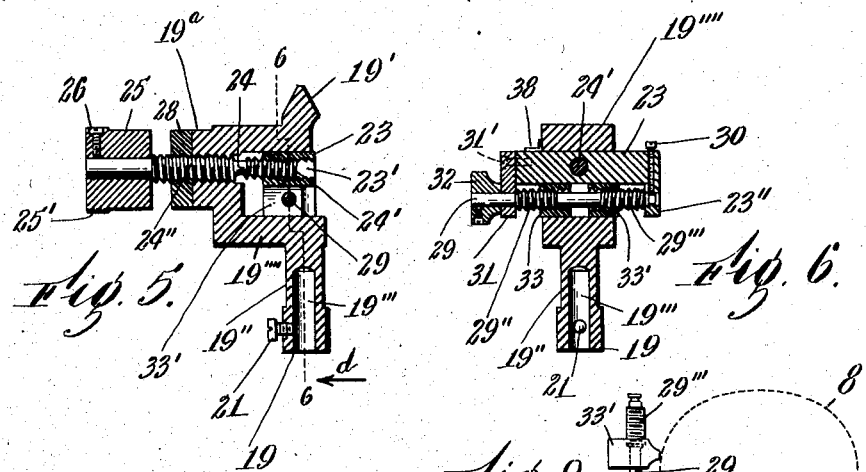
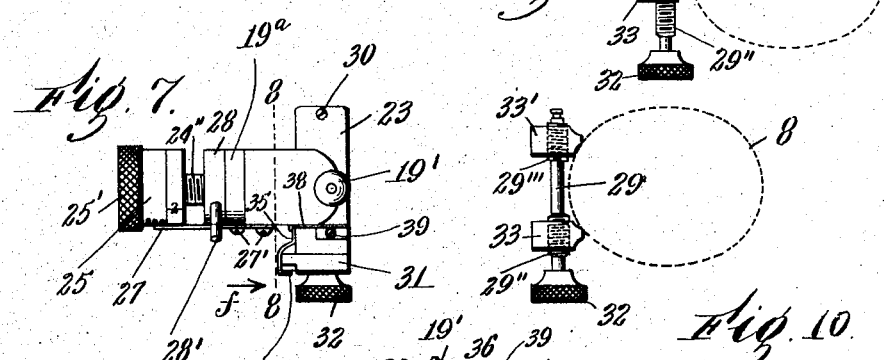
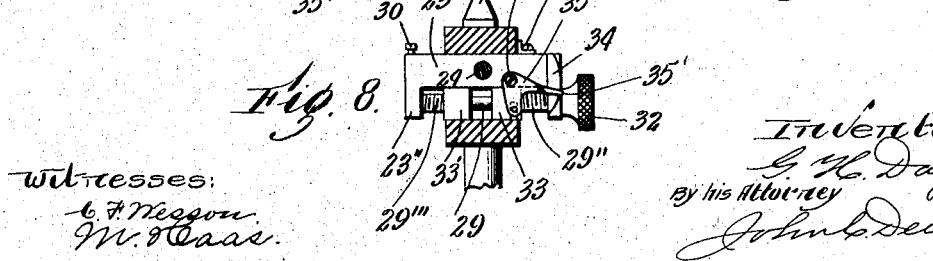
Witnesses:
C. F. Wesson
M. Haas
Inventor.
G. H. Day
By his Attorney
John L. Dewey No. 791,254.

Patented May 30, 1905.

UNITED STATES PATENT OFFICE.

GEORGE H. DAY, OF SOUTHBRIDGE, MASSACHUSETTS, ASSIGNOR TO AMERICAN OPTICAL COMPANY, A CORPORATION OF MASSACHUSETTS.

LENS-CUTTING MACHINE.

SPECIFICATION forming part of Letters Patent No. 791,254, dated May 30, 1905.

Application filed March 24, 1905. Serial No. 251,790.

*To all whom it may concern:*

Be it known that I, GEORGE H. DAY, a citizen of the United States, residing at Southbridge, in the county of Worcester and State of Massachusetts, have invented certain new and useful Improvements in Lens-Cutting Machines, of which the following is a specification.

My invention relates to new and useful improvements in a lens-cutting machine or a machine for cutting spherical and cylinder lenses of different sizes for spectacles and eyeglasses, and more particularly relates to improvements in the lens-cutting machine shown and described in United States Letters Patent No. 602,207.

The object of my invention is to improve upon the construction of some of the parts of said patented machine, and more particularly the mechanism for adjusting the position of the cutter-holder relatively to the lens-pattern, so that lenses of the different sizes and shapes commercially used may be cut on one machine.

In my improvements I provide on the cutter-holder two blocks or surfaces which engage the edge of the lens-pattern, which moves the cutter-holder, and form a bearing-surface for the lens-pattern. Said blocks are adjustable toward and away from the center line of the lens-cutting tool, according to the desired size of the lens to be cut. They are also adjustable toward and away from each other, according to the desired shape of the lens to be cut, to vary the size of the opening between them, into which opening the edge of the lens-pattern enters as it rotates in the operation of cutting the lens.

My invention consists in certain novel features of construction of my improvements, as will be hereinafter fully described.

I have shown in the drawings a lens-cutting machine of the type referred to and corresponding to the lens-cutting machine shown in said patent, No. 602,207, with my improvements applied thereto.

Referring to the drawings, Figure 1 is a side view of a lens-cutting machine with my improvements applied thereto. Fig. 2 is a detached view of some of the parts shown in Fig. 1 looking in the direction of arrow *a*, same figure. Fig. 3 shows, on an enlarged scale, the parts shown at the left in Fig. 2. Fig. 4 is an end view of the parts shown in Fig. 3 looking in the direction of arrow *b*, same figure. Fig. 5 is a section on line 5 5, Fig. 4, looking in the direction of arrow *c*, same figure. Fig. 6 is a section on line 6 6, Fig. 5, looking in the direction of arrow *d*, same figure. Fig. 7 is a plan view of the parts shown in Fig. 3 looking in the direction of arrow *e*, same figure. Fig. 8 is a section on line 8 8, Fig. 7, looking in the direction of arrow *f*, same figure. Fig. 9 is a detached view showing by broken lines the lens-pattern and the adjusting-blocks bearing against the edge thereof; and Fig. 10 corresponds to Fig. 9, but shows a different position of the blocks.

In the accompanying drawings, 1 is the stand or frame of the machine, on which are supported the several parts.

2 is the bed-gear provided with a pad 3, upon which the lens 4 to be cut is placed.

5 is the center tension-rod, the lower end of which presses on the center point of the lens and holds it on the pad.

6 is a knob secured on the top of the center tension-rod 5 and by which said rod may be raised, if desired.

7 is a thumb-screw which regulates the tension or pressure of the rod 5 on the lens.

8 is the lens-pattern secured on the arbor 9, and 10 is a gear secured on the upper end of said arbor, and 11 is a handle for turning said gear. The gear 10 meshes with the pinion 12 on an upright shaft 13, carrying at its lower end a pinion 14, which meshes with and turns the bed-gear 2.

15 is the swinging cutter-holder frame, fast on a vertical shaft 16 and carrying the cutter-holder 19. The cutter-holder frame 15 is provided with a spring in the usual and well-known way (not shown) and is adapted to move the frame inwardly and hold it against the lens-pattern 8.

18 is a lever pivotally supported on the stand or frame 1 and having the engaging end 18' and connected with the central rod or support (not shown) of the bed-gear 2. The depression of the lever 18 raises the bed-gear 2, the pad 3, and the lens 4 thereon to bring the lens against the end of the tool or cutter in the usual way.

The swinging cutter-holder frame 15 carries at its free end the rotary cutter-holder 19, the upper tapering end 19' of which enters into a recess in the lower end of a screw 20, adjustable in the upper arm of the frame 15. The lower part of the holder 19 has the reduced portion 19'', which is rotatively supported in a bearing 15' on the lower arm of the frame 15. Within an opening 19''' on the lower end of the holder 19 is secured, by a screw 21, the upper end of the cutter or cutting-tool 22. The holder 19 has a side extension 19'''' thereon.

All of the above-mentioned parts may be of the ordinary and well-known construction in the class of machines referred to.

I will now proceed to describe my improvements, which, as above stated, relate more particularly to the combination, with the cutter-holder, of two blocks or surfaces which engage the edge of the lens-pattern and which are adjustable toward and away from the center line of the lens-cutting tool 22 according to the size of the lens desired to be cut and are also adjustable relative to each other to be moved toward each other or away from each other to vary the size of the opening between the blocks to receive the edge of the lens-pattern according to the desired shape of the lens to be cut.

The side extension 19'''' on the cutter-holder 19 is recessed or cut out to receive a movable transverse bar 23, which has a screw-threaded hole 23' through its central part, into which extends and turns the threaded end 24' of an adjusting-rod 24, which is mounted and turns in a threaded hole in the outer end of the side extension 19'''' on the holder 19 and a hub extension 19ª thereon. (See Fig. 5.) The thread 24'' on the rod 24, which engages the thread in the side extension 19'''' and hub 19ª, is cut in an opposite direction from the thread 24', which engages the opening 23' in the transverse bar 23, one being a right-hand and the other a left-hand thread. By this construction of the threads 24' and 24'' the rotation of the adjusting-rod 24 communicates a much quicker motion to the transverse bar 23 to move the same in and out within the recess in the side extension 19'''' on the holder 19. On the outer end of the rod 24 an engaging end 25 of circular shape with a knurled portion 25' is secured by a screw 26. (See Fig. 5.)

There are index-lines or a scale on the engaging end 25 to indicate the desired amount of rotation of the rod 24, which lines in this instance are adapted to register with a stationary pointer 27, consisting of a thin blade secured at one end by screws 27' to the hub 19ª and side extension 19'''' on the holder 19. (See Fig. 3.)

A set-nut 28, with an engaging pin 28', is mounted on the threaded part 24'' on the adjusting-rod 24 and is adapted to be screwed up against the end of the hub 19ª after the rod 24 has been rotated to adjust the position of the transverse bar 23 to hold said rod 24 and bar 23 in their adjusted position. (See Fig. 5.)

On one end of the transverse bar 23 is a downwardly-extending projection 23'', having an opening therethrough for the inner end of an adjusting-rod 29 to rotate in. In a threaded hole in the end of the transverse bar 23 is in this instance an adjustable friction-screw 30, the inner end of which is adapted to extend into an annular groove in the end of the rod 29 and by its frictional contact with said rod 29 acts to hold said rod from turning after it is adjusted. (See Fig. 6.) The opposite end of the adjusting-rod 29 is loosely supported to rotate in an opening through a plate 31, attached by screws 31' to the end of the transverse bar 23. (See Figs. 3 and 6.) Fast on the projecting end of the rod 29 is a knurled knob 32 to turn said rod. The rod 29 has two threaded portions 29'' and 29''', one a right-hand and the other a left-hand thread. Mounted on the two threaded portions 29'' and 29''' of the rod 29 are two blocks 33 and 33', the outer ends of which are adapted to engage the edge of the lens-pattern 8. (See Figs. 9 and 10.)

By turning the adjusting-rod 29 in one direction the two blocks 33 and 33' are simultaneously moved toward each other, whereby the two surfaces against which the edge of the pattern 8 bears are brought so close together that the shape traced by the cutting-tool conforms almost exactly to the shape of the pattern, as shown in Fig. 9. By turning the rod 29 in the opposite direction the two blocks 33 and 33' are simultaneously moved apart, thus leaving an opening between the two surfaces against which the pattern 8 bears and allowing the ends of the pattern 8 to enter between the two surfaces, as shown in Fig. 10, so that the shape traced by the cutting-tool is relatively shorter on the major axis.

To regulate the amount of rotation of the rod 29 and the position of the blocks 33 and 33' relative to each other according to the desired shape of the lens to be cut without changing the lens-pattern 8, a stationary index or scale 34 is provided on the inner edge of the end plate 31. (See Fig. 3.) A movable pointer 35' registers with said index. The pointer 35' is on one arm of an angle-lever 35, pivotally attached by a screw 36 to the outer side of the transverse bar 23. (See Fig. 8.) The other arm of the angle-lever 35 has a pin thereon which extends into a groove in the rear side of one of the blocks, as 33.

The turning of the rod 29 and the moving of the blocks 33 and 33' toward each other or away from each other will, through the movement of the block 33, move the angle-lever 35 and cause the pointer 35' to move up or down on the index 34.

On the upper edge of the side extension 19'''' of the holder 19 is a stationary index or scale 37, and a movable pointer 38, secured by a screw 39 on the upper end of the transverse bar 23, registers with said index 37. The index 37 is for the purpose of adjusting the position of the transverse bar 23, carrying the blocks 33 and 33' through the rotation of the adjusting-rod 24, according to the desired size of the lens to be cut.

The advantages of my improvements will be readily appreciated by those skilled in the art. They can be readily applied to and used on lens-cutting machines of ordinary construction and by means of the same lenses of any desired size or shape for commercial purposes can be cut with the use of only one lens-pattern. By means of the index-lines or scales and the pointer the several parts may be adjusted relative to each other and to the lens-pattern to cut exactly the size and shape of lens desired.

It will be understood that the details of construction of my improvements may be varied, if desired, and particularly the means for supporting and moving the two blocks or surfaces 33 and 33', which engage the edge of the lens-pattern and form the bearing-surface for the same.

I have described herein my machine for cutting lenses; but said machines may be used for cutting other articles, or for marking upon any material lines corresponding to a pattern, or may be used for any other purposes.

Having thus described my invention, what I claim as new, and desire to secure by Letters Patent, is—

1. In a machine for cutting lenses, &c., the combination with the cutter-holder, of two blocks or surfaces adapted to engage the edge of the lens-pattern, and to be moved toward and away from each other, to vary the size of the opening between them to receive the edge of the lens-pattern, substantially as shown and described.

2. In a machine for cutting lenses, &c., the combination with a swinging frame carrying the cutter-holder, and said cutter-holder, and a lens-pattern, of two blocks adapted to engage the edge of the lens-pattern, and to be moved toward and away from each other, to vary the width of the opening between them to receive the edge of the lens-pattern, substantially as shown and described.

3. In a machine for cutting lenses, &c., the combination with a swinging frame carrying the cutter-holder, and said cutter-holder, and a lens-pattern, of two blocks adapted to engage the edge of the lens-pattern, and supported on a rod having thereon a right and left hand thread to engage and move said blocks toward and away from each other, to vary the size of the opening between them, and a bar carrying said rod and movable in a direction toward and away from the lens-pattern, and means for moving said bar, substantially as shown and described.

4. In a machine for cutting lenses, &c., the combination with a swinging frame carrying the cutter-holder, and said cutter-holder, and a lens-pattern, of two blocks adapted to engage the edge of the lens-pattern, and supported on a rod having thereon a right and left hand thread to engage and move said blocks toward and away from each other, to vary the size of the opening between them, and a bar carrying said rod and movable in a direction toward and away from the center line of the lens-cutting tool, and means for moving said bar, comprising a rotary rod having a thread thereon to engage said bar, and a second thread thereon extending in an opposite direction to engage the cutter-holder, substantially as shown and described.

5. In a machine for cutting lenses, &c., the combination with the cutter-holder, of two blocks adapted to engage the edge of the lens-pattern, and adjustable toward and away from each other to vary the size of the opening between them, an adjusting-rod for said blocks, having a right and left hand thread thereon, an adjustable bar carrying said rod, an index or scale connected with said bar, and a pointer moved by the turning of said adjusting-rod to register with said scale, substantially as shown and described.

6. In a machine for cutting lenses, &c., the combination with the cutter-holder, of a movable bar, carrying an adjusting-rod and two blocks connected with said rod for engaging the edge of the lens-pattern, and means for moving said bar toward and away from the center line of the lens-cutting tool, and a pointer on said bar, adapted to register with index-lines or a scale on the cutter-holder, substantially as shown and described.

7. In a machine for cutting lenses, &c., the combination with the cutter-holder, of a bar carrying an adjusting-rod and two blocks connected with said rod, for engaging the edge of the lens-pattern, and means for moving said bar toward and away from the center line of the lens-cutting tool, said means comprising a rotary rod having a right and left hand thread thereon to engage said bar and cutter-holder, and said rod having an engaging end or knob with index-lines or a scale thereon, to register with a stationary pointer on the cutter-holder, substantially as shown and described.

8. In a machine for cutting lenses, &c., the combination with the cutter-holder, of a bar carrying an adjusting-rod and two blocks connected with said rod for engaging the edge of the lens-pattern, and means for moving said bar toward and away from the center line of the lens-cutting tool, said means comprising a rotary rod having a right and left hand thread thereon, and a nut thereon for holding said rod after it has been moved, substantially as shown and described.

9. In a machine for cutting lenses, &c., a bearing-surface on the cutter-holder, for the edge of the lens-pattern, said bearing-surface comprising two blocks or surfaces movable toward and away from each other, to vary the width of the opening between them, and allow the edge of the lens-pattern to enter between said blocks to a greater or less extent, substantially as shown and described.

GEO. H. DAY.

Witnesses:
C. F. HILL,
J. C. WELLS.